INVENTORS
Robert W. Felhofer
and Carl M. Fink
BY Diggins & LeBlanc
ATTORNEYS

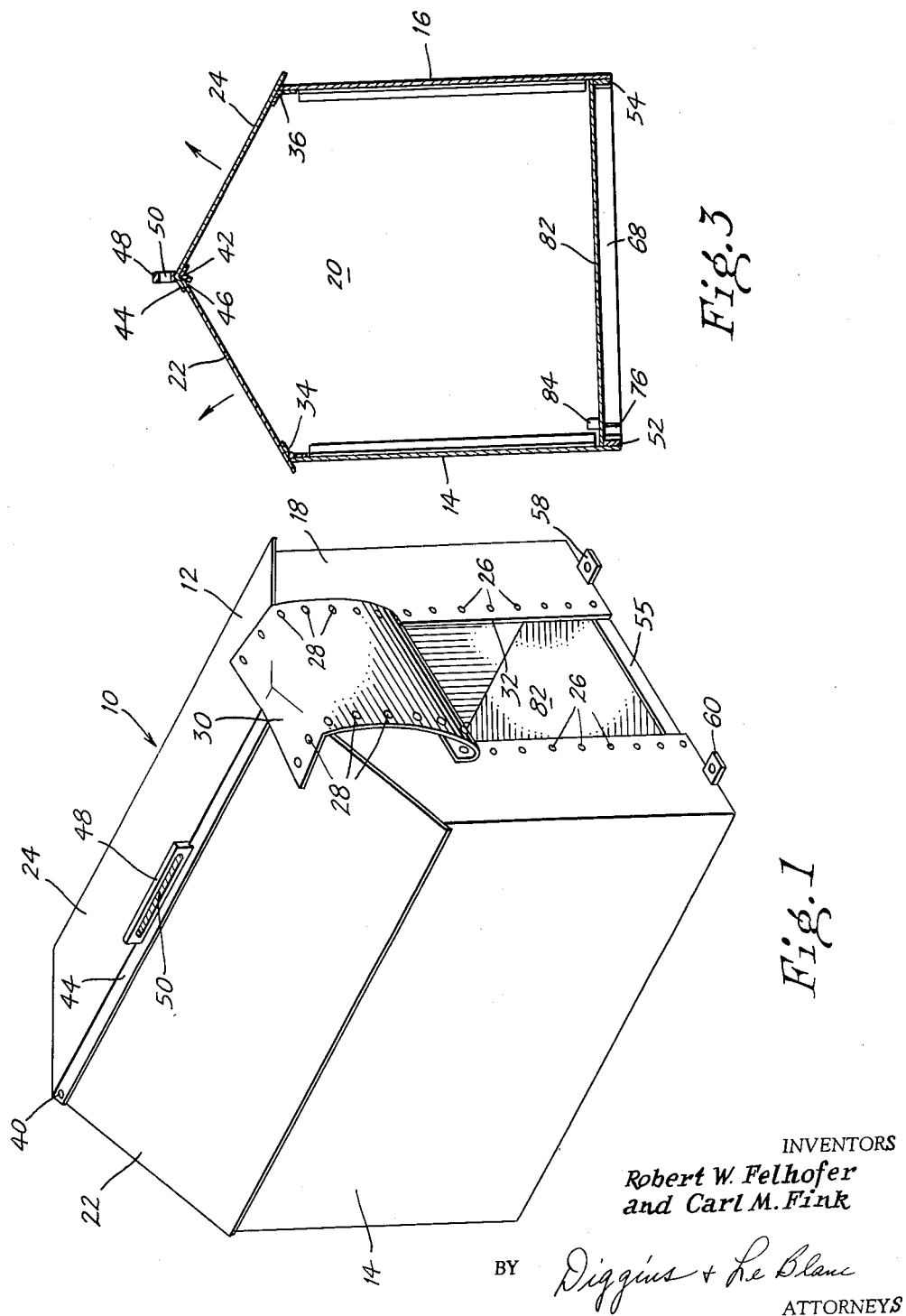
April 9, 1963   R. W. FELHOFER ETAL   3,084,667
FOLDABLE PET HOUSE AND CARRYING CASE
Filed April 8, 1960   4 Sheets-Sheet 1
INVENTORS
Robert W. Felhofer
and Carl M. Fink
BY Diggins + LeBlanc
ATTORNEYS April 9, 1963    R. W. FELHOFER ETAL    3,084,667
FOLDABLE PET HOUSE AND CARRYING CASE
Filed April 8, 1960    4 Sheets-Sheet 2

April 9, 1963 R. W. FELHOFER ETAL 3,084,667
FOLDABLE PET HOUSE AND CARRYING CASE
Filed April 8, 1960 4 Sheets-Sheet 3

INVENTORS
Robert W. Felhofer
and Carl M. Fink

BY Diggins & Le Blanc
ATTORNEYS

April 9, 1963 R. W. FELHOFER ETAL 3,084,667
FOLDABLE PET HOUSE AND CARRYING CASE
Filed April 8, 1960 4 Sheets-Sheet 4
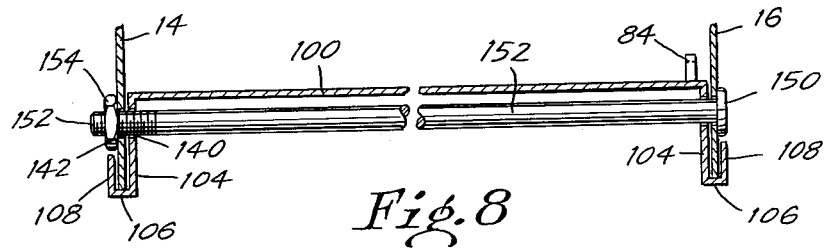
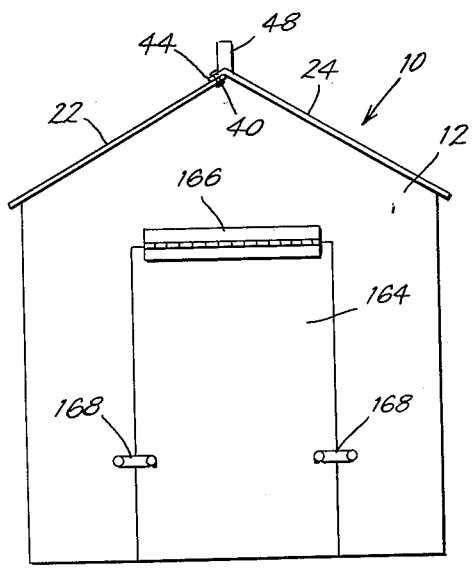
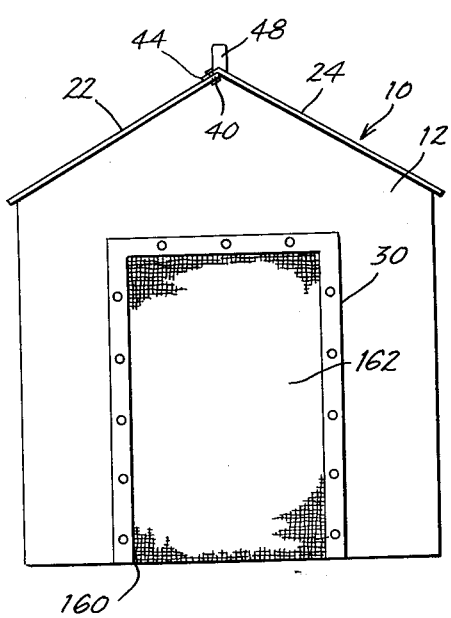
INVENTORS
Robert W. Felhofer
and Carl M. Fink
BY Diggins + LeBlanc
ATTORNEYS 3,084,667
FOLDABLE PET HOUSE AND CARRYING CASE
Robert W. Felhofer, 4925 W. Concordia Ave., Milwaukee, Wis., and Carl M. Fink, 501 N. Grandview Ave., Daytona Beach, Fla.
Filed Apr. 8, 1960, Ser. No. 21,026
10 Claims. (Cl. 119—19)

This invention relates to a foldable or collapsible structure and more particularly to a foldable pet house and carrying case constituting either a permanent home or a readily transportable conveyance for animals, and particularly for domestic animals such as dogs, cats and the like.

While numerous types of pet houses and carrying cases have been proposed most earlier constructions suffer from one or more serious disadvantages in that the devices are not easily collapsed, are relatively expensive to manufacture, are often rather heavy and bulky to handle or do not exhibit sufficient strength and rigidity to constitute a permanent home for animals.

In copending application Serial No. 842,031, filed September 24, 1959, now U.S. Patent No. 3,043,264, there is disclosed a novel combination pet house and carrying case in the form of a folding framework adapted to be enclosed by a separate cover to form a substantially rigid structure. The present invention relates to an improved pet house and carring case of the same general type which completely eliminates the necessity for the supporting framework. The structure of the present invention relates to a novel collapsible rigid shell completely self-supporting and preferably made of light weight metal such as aluminum so as to be readily portable.

The novel pet house of the present invention includes tabs at the four corners adapted to receive screws, nails, bolts, rods or the like for fastening the pet house securely in wood, concrete, earth, steel or similar materials so that the pet house may be utilized as a stationary permanent or semi-permanent animal home if desired. The complete unit is lightweight, portable, compactly and easily stored, durable, rustproof, fireproof, sanitary and easily cleaned.

The complete unit may be readily moved for use outside, in a basement, in a garage, in a breezeway or wherever desired, depending upon the climate and weather conditions. The unit requires a minimum of space and is easily transported either when folded or unfolded. The pet house may be collapsed and placed in an auto trunk, in an auto roof carrier, in a trailer or in similar relatively small compartments.

It is therefore a primary object of the present invention to provide a novel, collapsible pet house and carrying case.

Another object of the present invention is to provide a novel collapsible pet house and carrying case which completely eliminates the necessity of any supporting frame.

Another object of the present invention is to provide a knock-down pet house and carrying case of lightweight and extreme versatility.

Another object of the present invention is to provide improved door openings for a combination portable pet house and carrying case.

These and further objects and advantages of the invention will be more apparent upon reference to the following specification, claims and appended drawings wherein:

FIGURE 1 is a perspective view of the novel combination pet house and carrying case of the present invention in assembled position and ready for use.

FIGURE 3 is a vertical cross-section taken along line 3—3 of FIGURE 2.

FIGURE 8 is a cross-section similar to FIGURE 7 showing a modified arrangement for attaching the pet house floor to the side walls.

FIGURE 9 shows a modified entrance cover, and

FIGURE 10 shows a still further modified embodiment incorporating a metallic entrance cover.

Figure 4:
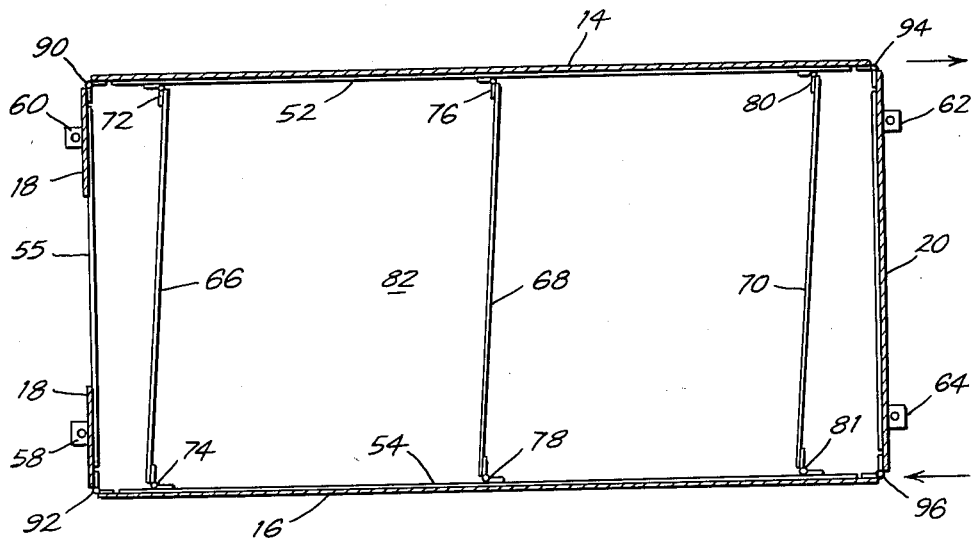
FIGURE 4 is a horizontal cross-section taken along line 4—4 of FIGURE 2, but showing the floor member removed.
Figure 2:
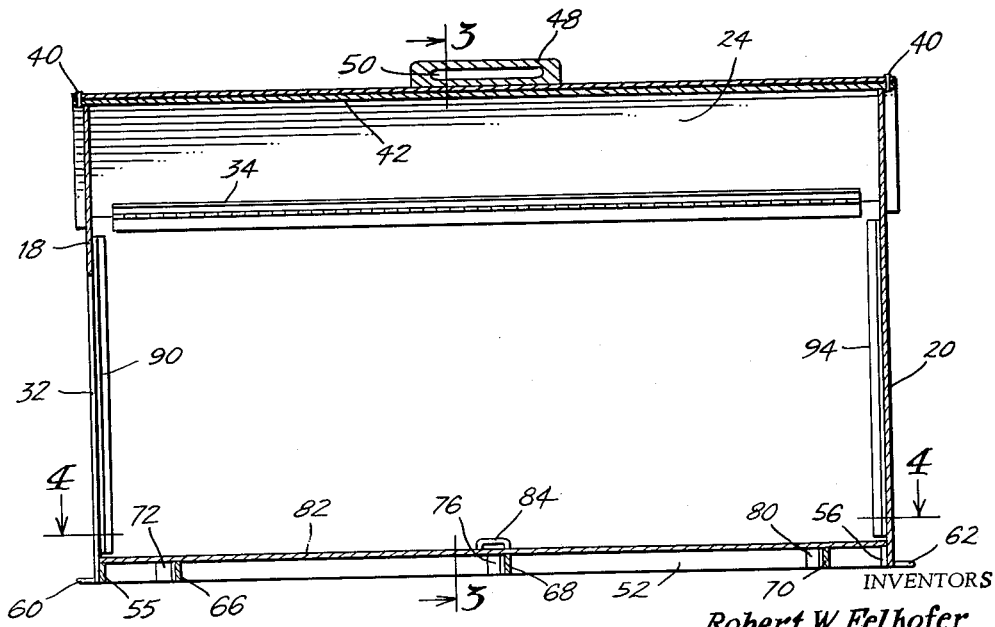
FIGURE 2 is a vertical longitudinal section taken through the center of the pet house of FIGURE 1.

Referring to the drawings and more particularly to FIGURES 1 through 4, the novel combination pet house and carrying case of the present invention generally indicated at 10 in FIGURE 1 comprises a rigid shell 12 preferably constructed of lightweight metal such as aluminum. The shell includes side walls 14 and 16, front wall 18, rear wall 20 and roof sections 22 and 24. It is apparent that the shell 12 can if desired be made from suitable weatherproof plastic or other rigid materials.

Front wall 18 is provided with a series of snaps 26 adapted to be engaged by mating snap fasteners 28 formed on canvas cover 30, constructed to close off the entrance opening 32 formed in the front wall of the pet house.

The roof sections 22 and 24 as best seen in FIGURE 3 are connected to the side walls 14 and 16 by hinges 34 and 36. Joining the front and rear roof sections together are conventional fasteners 40. These fasteners secure the roof sections against inadvertently opening when the unit is being carried but may be released to permit the shell to collapse when the pet house is not in use.

Roof section 24 carries an angle iron 42 which may be welded, brazed or otherwise suitably fastened to the roof section and which acts as a stiffener for the pet house roof. Roof section 24 also includes a turned over end 44 which rests on the upper surface of cooperating section 22 with the extreme end 46 of this latter section being removably received between the angle member 42 and turned over edge 44. Fastened to the top of roof section 24 is a handle 48 having an aperture 50 so that the handle may be grasped by a hand in lifting and carrying the assembled combination pet house and carrying case.

Joined to the lower inner edges of side walls 14 and 16 as seen in the plan view of FIGURE 4 are a pair of aluminum bars 52 and 54, respectively. By way of example only in one embodiment the bars were ⅛ of an inch thick and ¾ of an inch wide extending substantially along the entire length of the side walls. Bars 55 and 56 of similar width and thickness extend along the lower inner edges of the front wall 18 and rear wall 20. Secured to the outer surfaces of bars 54 and 56 and passing through suitable slots or notches in the lower edges of front wall 18 and rear wall 20 are brackets 58, 60, 62 and 64, each having ¼ inch holes for fastening the pet house to a sub-base with rods, screws, nails, spikes or the like.

Extending crosswise of the pet house from bar 52 to bar 54 are three aluminum bar joists 66, 68 and 70. Joist 66 is secured to bar 52 by hinge 72 and to bar 54 by hinge 74. Joist 68 is secured to bar 52 by hinge 76 and to bar 54 by hinge 78. Joist 70 is similarly secured to bar 52 by hinge 80 and to bar 54 by hinge 81.

Resting on the bars 52, 54, 55 and 56 as well as joists 66, 68, and 70 is a flat sheet of aluminum flooring 82 of such dimensions as to snugly fit within the four walls of the pet house. The floor may be provided with an upwardly extending tab 84 adjacent one edge by means of which the floor may be gripped for the purposes of removal.

Each of the four walls are joined together by hinges 90, 92, 94 and 96 at each corner of the shell. The hinge construction of the walls and the transverse joist members is such that when the floor is removed as in FIGURE 4 the entire structure is adapted to be collapsed into substantially a single plane with relative movement of the side walls 14 and 16 in the opposite direction as indicated by the arrows in FIGURE 4. It is apparent that when being used the structure is kept rigid in its uncollapsed rectangular configuration partly by the rigidity of the floor member 82. However, when it is desired to collapse the pet house the floor 82 is lifted by the tab 84 so as to stand on one edge and the unit collapsed so that walls 14 and 16 are brought together in substantially a single plane. Prior to bringing the walls 14 and 16 together in collapsing the structure of FIGURES 1 through 4, it is necessary to raise the roof sections 22 and 24 in the directions indicated by the arrows in FIGURE 3 to bring the roof sections into alignment with the respective side walls so that the whole structure is collapsed into a planar configuration. The abutment of end portion 46 of roof section 22 against stiffening angle member 42 cooperates with the floor 82 in maintaining the unit rigid during use.

Figure 5:
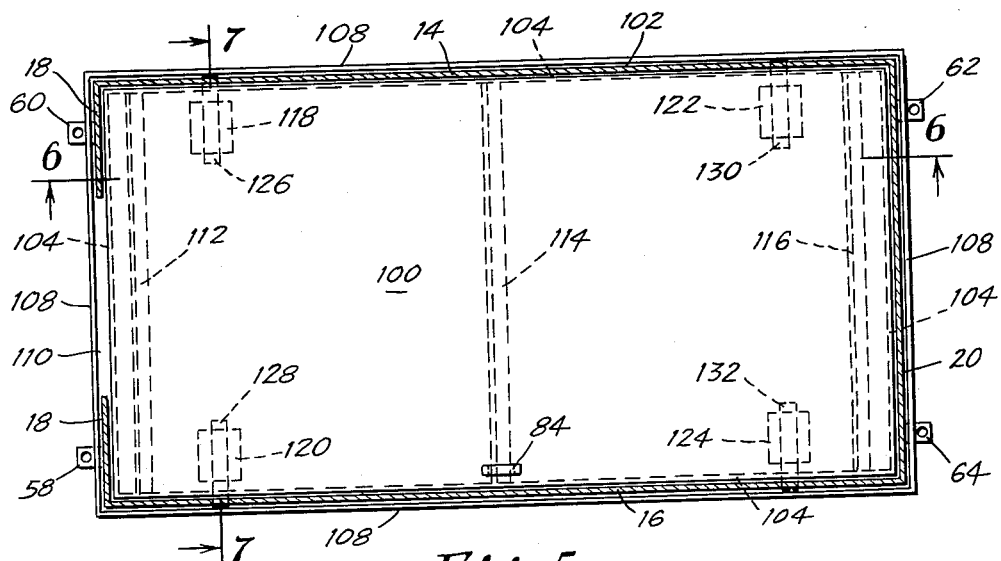
FIGURE 5 is a horizontal cross-section through a modified embodiment showing an arrangement wherein the pet house floor is attached to the side walls.
Figure 6:
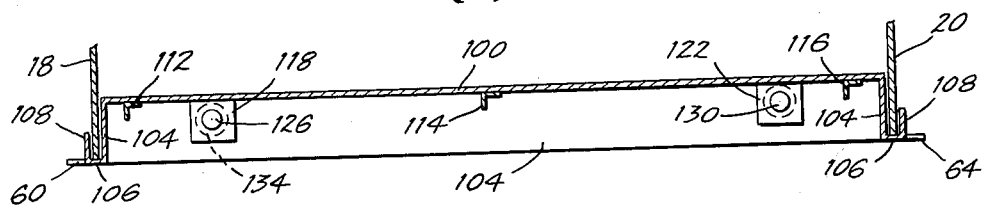
FIGURE 6 is a vertical cross-section through a portion of the modified embodiment of FIGURE 5 taken along lines 6—6 of FIGURE 5.
Figure 7:
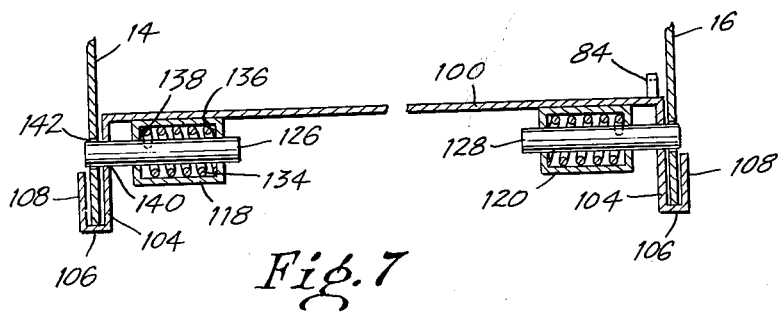
FIGURE 7 is a partial vertical cross-section taken along line 7—7 of FIGURE 5.

FIGURES 5 through 7 show a modified construction of the floor suitable for use with the shell of FIGURES 1 through 4 or with the aluminum covering disclosed in copending application Serial No. 842,031, filed September 24, 1959. As shown in FIGURE 5 the novel floor construction involves a sheet of aluminum flooring 100 having a U-shaped edge 102 extending around its entire periphery with the edge including a downwardly bent segment 104, a horizontal segment 106 and an upwardly extending segment 108 defining a peripheral slot or groove 110. The front and side walls 14 and 16 of the shell 12 as well as the front and rear walls 18 and 20 are snugly received within the groove 110. In this embodiment the bars 52, 54, 55 and 56 are omitted. The flooring 100 may be reinforced by transverse aluminum angle members 112, 114 and 116 secured to the underside of the flooring and to the peripheral flange 104 on opposite sides of the structure.

Attached to the underside of the floor 100 are four spring bolt housings 118, 120, 122 and 124 within which are slidably received the spring bolts 126, 128, 130 and 132. Each of the spring bolts is similarly constructed and a description of the spring bolt 126 in housing 118 is deemed sufficient. A helical spring 134 surrounds the spring bolt 126 and is secured at end 136 to the housing 118 and at end 138 to the spring bolt 126. In this way the bolt 126 is urged outwardly by spring 134 through slots 140 in flange 104 and 142 in wall 14 thus joining the floor 100 to the wall. Spring bolts 128, 130 and 132 are similarly spring urged through cooperating apertures in the floor flange 104 and the side walls so that the floor is fastened to the side walls at the four positions indicated. The floor may be disengaged from the side walls by manual pressure exerted inwardly on each of the spring bolts and removal of the side walls from the peripheral slot 104.

FIGURE 8 shows a modified arrangement for fastening the floor to the wall involving a through-bolt having an enlarged head 150 at one end and threaded at its other end 152 to receive a nut 154. The through bolt passes through the aligned apertures 140 and 142 in flange 104 and wall 14 and with the nut 154 tightened on the through-bolt the walls 14 and 16 are rigidly secured to the floor. It is preferable to utilize such through-bolts at the approximate positions of the spring bolts illustrated in FIGURES 5 and 6.

FIGURE 9 shows a modification of the pet house 10 wherein the cotton or fabric cover 30 includes a central opening 160 across which is stretched a wire mesh or screen 162. The screen construction permits the ready access of air into the interior of the pet house. The entire cover including screen 162 may be fastened to the pet house by the fasteners in the manner of FIGURE 1. The wire screen may be sewn or otherwise secured to the fabric which surrounds its outer edges on three sides as shown.

FIGURE 10 shows a further modification wherein the aperture 32 of the pet house shown in FIGURE 1 is closed off by a metallic and preferably aluminum door 164. The door is fastened to the shell 12 along its upper edge by a piano hinge 166 and may be fastened in place by the pivoted lock-type fasteners 168 of the type shown and described in the aforementioned copending application.

From the above it is apparent that the present invention provides novel pet house and carrying case of very lightweight and yet rigid construction. While the unit is described as suitable for carrying animals it is understood that the enclosure may be readily adapted for housing any other desired object or for transporting other objects if desired. The unit is extremely versatile and may be moved and placed at any desired location and further may be securely fixed to a base surface such as the earth, concrete or the like. In the preferred construction the entire unit is made of lightweight and rustproof aluminum but other suitable rigid materials may be employed. The unit of the present invention makes it possible to entirely do away with a supporting frame since the novel cooperation of the shell with the roof and floor structures as shown maintains the rectangular rigidity of the structure under the most adverse circumstances. The unit is simply and inexpensively manufactured, is lightweight, durable and when made of aluminum is completely rustproof and vermin proof. Ready access may be had to the entire unit for cleaning to maintain complete sanitary conditions.

The roof fasteners 38 and 40 are preferably constructed in the same manner as door fasteners 168 shown in FIGURE 10. However, other suitable fastening devices for releasably holding the roof sections together may also be employed.

In some applications and in the smaller sized units it may be possible to reduce the reenforcing by omitting one or two of the supporting bars such as bars 52 and 54.

This application is a continuation-in-part of copending application Serial No. 842,031 filed September 24, 1959, now U.S. Patent No. 3,043,264.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A collapsible animal enclosure comprising a front wall, a rear wall and two side walls, said walls being hinged together at their corner intersections, a roof section extending along and hinged to the top of each side wall, said roof sections contacting the tops of said front and rear walls and having their free edges in substantial contact with each other, a floor member in the bottom of said enclosure and at least one support extending substantially normally to said sides and under said floor and pivotally connected at its ends to each of said sides, whereby the enclosure may be collapsed into a substantially planar configuration upon removal of said floor member.

2. A collapsible container according to claim 1 including a handle on one of said roof sections.

3. A collapsible animal enclosure according to claim 2, including latch means operatively connected to the free edges of the roof sections whereby the roof sections are prevented from inadvertently opening when a unit is being carried.

4. A collapsible animal enclosure comprising a front wall, a rear wall and two side walls, said walls being hinged together at their corner intersections, a roof section extending along and hinged at the top of each side wall, said roof sections contacting the tops of said front and rear walls, one of said roof sections having its free edge removably received in a groove adjacent the free edge of the other of said roof sections, a removable floor member in the bottom of said enclosure and a plurality of transverse support members extending substantially normally to said sides and under said floor and each being pivotally connected at its ends to each of said sides to enable the enclosure to be collapsed into a substantially planar configuration after removal of said floor member.

5. A collapsible pet house and carrying case comprising a front wall, a rear wall and two side walls, said walls being hinged together at their corner intersections, a roof section extending along and hinged to the top of each side wall, said roof sections contacting the tops of said front and rear walls and having their free edges in substantial contact with each other, a handle on one of said roof sections, a reinforcing bar secured to the lower portion of each of said walls, a floor member in the bottom of said pet house and a plurality of joists extending substantially normally to said sides and under said floor and being pivotally connected at opposite ends to the reinforcing bars of said side walls, said floor member freely resting on said bars and joists, and said front wall including an access aperture and a movable cover closing off said aperture.

6. A collapsible pet house and carrying case according to claim 5 wherein said walls and roof sections are metallic sheets.

7. A collapsible pet house and carrying case according to claim 6 wherein said walls and roof sections are aluminum.

8. A collapsible pet house and carrying case according to claim 7 wherein said cover is pivoted to said front wall above said aperture.

9. A collapsible pet house and carrying case according to claim 8 wherein said cover is aluminum.

10. A collapsible pet house and carrying case according to claim 8 wherein said cover includes an air pervious screen.

References Cited in the file of this patent
UNITED STATES PATENTS

| | | |
|---|---|---|
| 1,121,425 | Wakeman | Dec. 15, 1914 |
| 1,303,736 | Speicher | May 13, 1919 |
| 1,576,330 | Kramerer | Mar. 9, 1926 |
| 1,669,300 | Hunter | May 8, 1928 |
| 2,258,344 | Walker | Oct. 7, 1941 |
| 2,759,622 | Simmons et al. | Aug. 21, 1956 |
| 2,771,896 | Call | Nov. 27, 1956 |
| 2,902,976 | Wilson | Sept. 8, 1959 |